United States Patent
Peritt et al.

(10) Patent No.: US 7,841,562 B2
(45) Date of Patent: Nov. 30, 2010

(54) LOAD PATCH FOR AIRSHIPS

(75) Inventors: Jonathan Peritt, Clinton, OH (US); Dennis L. Carter, Hudson, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 530 days.

(21) Appl. No.: 11/182,563

(22) Filed: Jul. 15, 2005

(65) Prior Publication Data

US 2007/0018050 A1    Jan. 25, 2007

(51) Int. Cl.
*B64B 1/22* (2006.01)
(52) U.S. Cl. ............................. 244/127; 244/126
(58) Field of Classification Search ............... 244/30, 244/31, 126, 127; 114/102.31, 108, 113; 135/119, 120.4; 52/2.25, 2.26; 482/27; 428/57, 428/58, 120, 108, 109, 110, 61; 441/35
See application file for complete search history.

(56) References Cited

U.S. PATENT DOCUMENTS

| | | | | |
|---|---|---|---|---|
| 2,448,269 A * | 8/1948 | Loudenslager et. al. | ...... | 244/127 |
| 2,960,282 A * | 11/1960 | Winzen | ............... | 244/31 |
| 3,845,584 A * | 11/1974 | Mercer | ................. | 47/56 |
| 3,871,603 A * | 3/1975 | Menke et al. | ............. | 244/125 |
| 3,993,269 A * | 11/1976 | Crosby, Jr. | ............. | 244/33 |
| 4,090,682 A * | 5/1978 | Parsons | .................. | 244/99 |
| 4,402,479 A * | 9/1983 | Phipps et al. | ............. | 244/116 |
| 4,664,266 A * | 5/1987 | Fausett et al. | ............ | 211/87.01 |
| 5,140,996 A * | 8/1992 | Sommers et al. | ............ | 128/849 |
| 5,219,633 A * | 6/1993 | Sabee | ......................... | 428/109 |
| 5,323,725 A * | 6/1994 | Conrad et al. | ............. | 114/102.3 |
| 5,334,446 A * | 8/1994 | Quantrille et al. | ............ | 442/35 |
| 5,395,134 A * | 3/1995 | Gunn et al. | ............... | 280/743.1 |
| 5,456,426 A * | 10/1995 | Wexler | ........................ | 244/127 |
| 5,560,384 A * | 10/1996 | Oh | ............................ | 135/115 |
| 5,628,172 A * | 5/1997 | Kolmes et al. | ................ | 57/210 |
| 5,681,302 A * | 10/1997 | Melbye et al. | ............. | 604/373 |
| 5,683,787 A * | 11/1997 | Boich et al. | ................. | 428/198 |
| 5,806,295 A * | 9/1998 | Robins et al. | ................. | 57/220 |
| 6,012,410 A * | 1/2000 | Monlezun et al. | ........... | 114/345 |
| 6,112,689 A * | 9/2000 | Baudet | .................. | 114/102.33 |
| 6,145,170 A * | 11/2000 | Bernard et al. | ................ | 24/298 |
| 6,260,497 B1 * | 7/2001 | Keire | ..................... | 114/102.29 |
| 6,302,044 B1 * | 10/2001 | Baudet | .................. | 114/102.33 |
| 6,315,242 B1 * | 11/2001 | Eichstedt et al. | .............. | 244/30 |

(Continued)

OTHER PUBLICATIONS

*Pressure Airships*; Thomas L. Blakemore; chapter 4; pp. 51-64; The Ronald Press Company, New York; 1927; Ronald Aeronautic Library.

*Primary Examiner*—Timothy D Collins
*Assistant Examiner*—Philip J Bonzell
(74) *Attorney, Agent, or Firm*—Renner Kenner Greive Bobak Taylor & Weber (57) ABSTRACT

A load patch for attaching concentrated loads to a flexible inflated structure such as a high-altitude airship is stiff in the direction of the applied load so as to carry the load, and is attached to the inflated structure for a very short distance through T-tape so as to minimize strain concentration in the inflated structure due to the stretching of the inflated structure. Since the load patch must be attached for a long length transverse to the load to distribute the applied load, it is transversely compliant to minimize strain concentration in the inflated structure due to stretching of the inflated structure.

19 Claims, 9 Drawing Sheets

U.S. PATENT DOCUMENTS

| | | | |
|---|---|---|---|
| 6,503,855 B1 * | 1/2003 | Menzies et al. | 442/328 |
| 6,923,470 B1 * | 8/2005 | Burgess | 280/727 |
| 6,979,479 B2 * | 12/2005 | Lavan et al. | 428/1.1 |
| 7,051,660 B2 * | 5/2006 | Insana et al. | 104/162 |
| 7,051,666 B2 * | 5/2006 | Baudet | 114/102.31 |
| 7,244,487 B2 * | 7/2007 | Brantley et al. | 428/119 |
| 2003/0125707 A1 * | 7/2003 | Popp et al. | 604/391 |
| 2003/0178055 A1 * | 9/2003 | Laakso et al. | 135/119 |
| 2004/0002392 A1 * | 1/2004 | Meadows | 472/49 |
| 2004/0073188 A1 * | 4/2004 | Mitsui et al. | 604/391 |
| 2005/0136771 A1 * | 6/2005 | Hendon et al. | 442/327 |

* cited by examiner

LOAD PATCH FOR AIRSHIPS

GOVERNMENT LICENSE RIGHTS

The U.S. Government may have a paid-up license in this invention and the right in limited circumstances to require the patent owner to license others on reasonable terms as provided for by the terms of Contract No. HQ0006-04-9-0001 awarded by the Missile Defense Agency—Department of Defense.

TECHNICAL FIELD

The present invention is related to a load patch for a high-altitude pressurized airship. More specifically, the present invention is related to a load patch for a high-altitude airship which limits the development of strain concentrations along a fabric skin of the airship. More particularly, the present invention is related to a load patch for a pressurized airship which has limited contact with the fabric skin and is composed of materials which efficiently distribute applied loads to the fabric skin.

BACKGROUND ART

Load patches serve to provide attachment points for securing various components including moorings, handling lines, and propulsion systems to the hulls of pressurized airships. Pressurized airships use a fabric skin for their hulls, which is expandable to accommodate changes in atmospheric pressure and temperature. Conventionally, the load patches are adhesively bonded directly to the fabric skin.

Generally, load patches are used to distribute the concentrated loads from the attachment of the moorings, handling lines, and propulsion systems into the fabric skin. Typically, conventional load patches are configured to disperse the concentrated loads radially outward away from the point of attachment of the respective component. To that end, conventional load patches usually have triangular shapes.

However, use of a conventional load patch leads to the development of relatively large strains concentrated along the fabric skin. For example, when attaching a conventional load patch to the fabric skin, the entire surface of one side of the load patch is adhesively bonded to the fabric skin to define a lamination area. During inflation of the pressurized airship, and changes in atmospheric pressure, the lamination area generates resistance to expansion within the fabric skin, and such resistance causes relatively large strains to develop along the fabric skin.

Due to the formation of the lamination area, relatively large strains develop during expansion of the fabric skin. These relatively large strains can be concentrated in areas of the fabric skin surrounding the lamination area. The effects of relatively large strains concentrated around the lamination area can be exacerbated when using the conventional load patches on a pressurized airship configured for high-altitude operation. There is a concern that the development of relatively large strains around the lamination area could cause a tear in the fabric skin resulting in catastrophic failure of the airship.

Figure 1A:
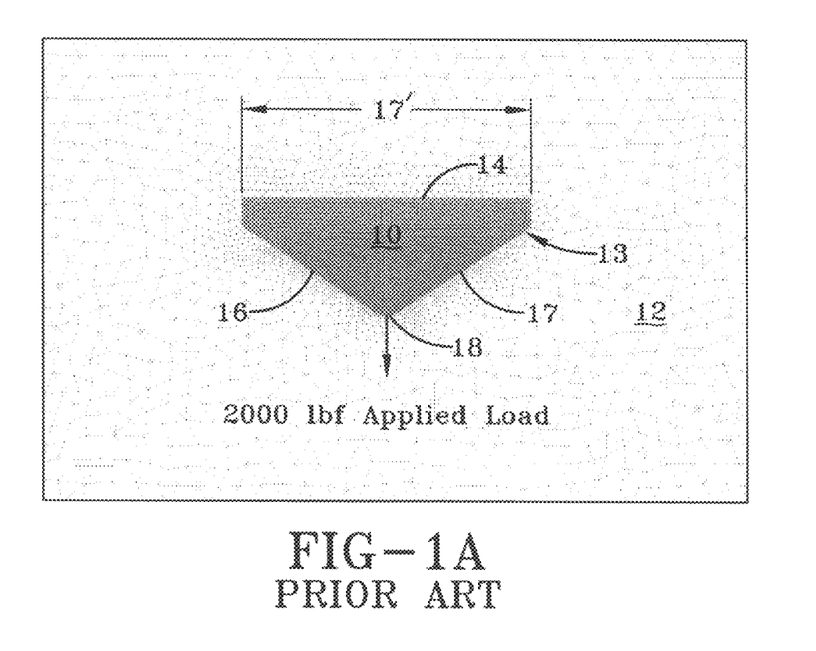
FIG. 1A is a representational view of a conventional load patch attached to the fabric skin of a high-altitude pressurized airship.
Figure 1B:
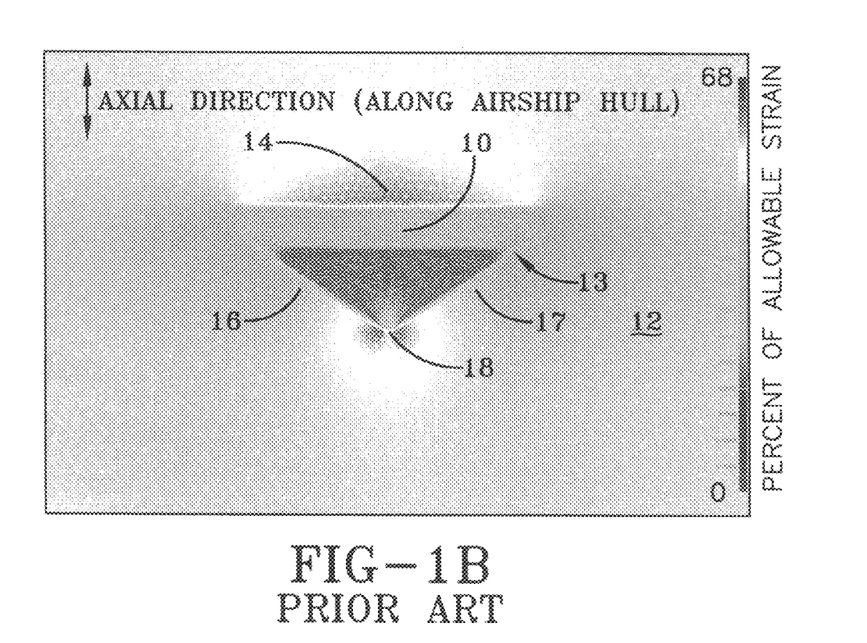
Figure 1C:
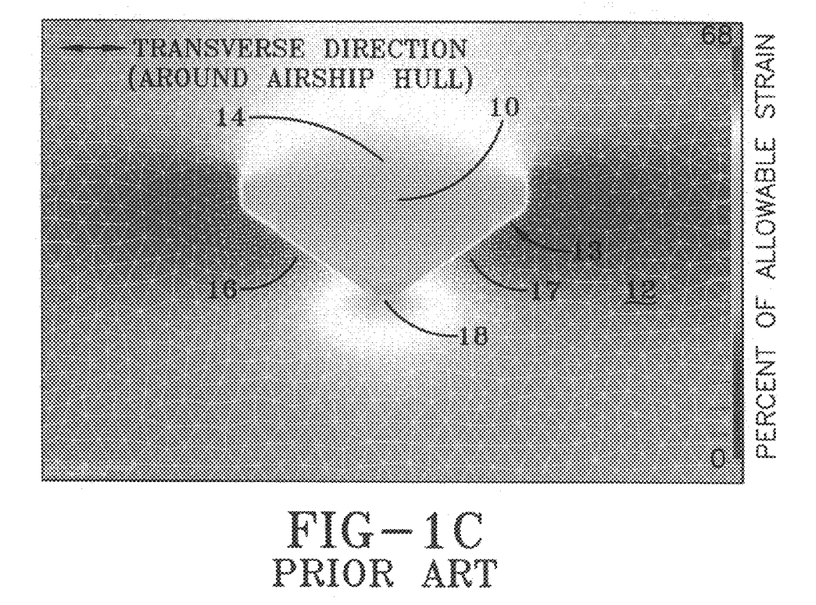
Figure 1D:
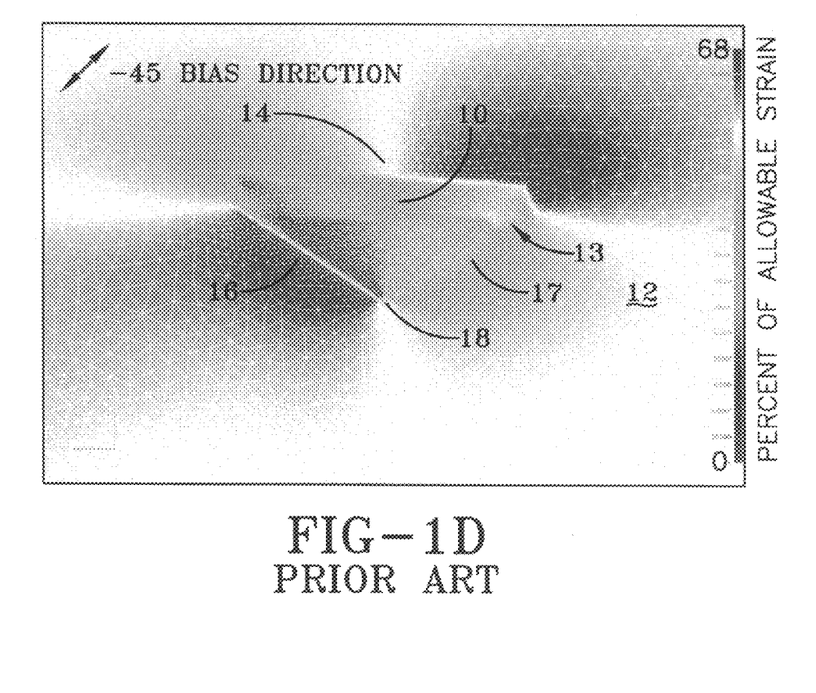

To illustrate the development of relatively large strains concentrated around the lamination area, FIGS. 1A, 1B, 1C, and 1D are provided. FIGS. 1B-1D are color representations of strains applied to a prior art load patch. Although not absolutely required for understanding the product, it is believed that FIGS. 1B-1D aid in understanding the prior art. And although dimensions are provided in the drawings, they are for reference only and should not be construed as a limitation.

FIG. 1A depicts a conventional load patch 10 bonded to a fabric skin 12 forming the hull of a pressurized airship. Together, the conventional load patch 10 and fabric skin 12 define a lamination area designated generally by the numeral 13. The conventional load patch 10 is triangularly shaped with a rear edge 14, a first angled edge 16 and a second angled edge 17. The first angled edge 16 and second angled edge 17 intersect at an apex 18. A load of 2000 lbf. load is applied to the conventional load patch 10 at the apex 18. The applied load simulates the concentrated loads applied by the moorings, handling lines, propulsion systems or other component secured to the fabric skin 12 through the conventional load patch 10.

The fabric skin 12 is constructed from a material that expands significantly during inflation of the pressurized airship, and changes in atmospheric pressure and temperature. FIG. 1A and the background of FIGS. 1B, 1C, and 1D demonstrate the deformation of the fabric skin 12 during expansion and application of different applied loads utilizing various colors to indicate the relative amounts of strain sustained by the fabric skin 12. A color gradient is used to represent the relative amounts of strain, which may range from red, indicating high amounts of strain, to purple/blue, indicating low amounts of strain.

In addition, FIGS. 1B, 1C, and 1D were developed using a SHELL finite element model employing classical laminate theory to depict the resistance to expansion that is generated by the lamination area 13, and to illustrate the strain generated as various colors related to percentages of maximum allowable strain. For example, FIGS. 1B, 1C, and 1D depict the strain developed in various areas along the fabric skin 12 as percentages from 0-68% of the maximum allowable strain in those areas. The gradations in color, as previously mentioned, indicate which of the various localities along the fabric skin 12 are experiencing the largest relative amounts of strain.

Because of the resistance to expansion generated by the lamination area 13 along the fabric skin 12, and due to the application of the applied load, differing amounts of strain develop along the fabric skin 12 due to expansion. FIGS. 1B, 1C, and 1D are provided to illustrate the differing amounts of strain developed along the fabric skin 12 in three (3) directions due to the resistance to expansion and the applied load. FIG. 1B depicts the amount of strain developed in the axial direction, FIG. 1C depicts the relative amount of strain developed in the transverse direction, and FIG. 1D depicts the relative amount of strain developed in the negative bias direction (oriented at forty-five degrees (−45°) with respect to the axial direction and transverse direction). It should be appreciated that a high amount of relative stress is sustained by the conventional load patch 10 is found in each of the axial, transverse, and negative bias directions, as indicated by the various red areas shown in FIGS. 1B-D.

As seen in FIG. 1B, relatively large strains, indicated as red areas, are found in the axial direction that projects outwardly from the rear edge 14, and in areas along the first angled edge 16 and second angled edge 17 adjacent the apex 18. Furthermore, as seen in FIG. 1C, relatively large strains in the transverse direction are concentrated in large areas projecting outwardly from the first angled edge 16 and second angled edge 17 near the rear edge 14. And, as seen in FIG. 1D, relatively large strains in the negative bias direction are concentrated in large areas projecting outwardly from the first angled edge 16, and from the rear edge 14 near its intersection with the second angled edge 17.

As illustrated in FIG. 1C, relatively large strains are developed around the lamination area 13 in the transverse direction. Because the application of the applied load is in the axial direction, and, hence, in a direction perpendicular to the transverse direction, the applied load has limited responsibility for the relatively large strains developed in FIG. 1C. The relatively large strains depicted in FIG. 1C are developed due to resistance to expansion generated by the lamination area.

When relatively large strains are concentrated in particular areas along the fabric skin 12, those areas are susceptible to catastrophic failure, and can result in tearing of the fabric skin 12. Because the relative amounts of strain depicted in FIGS. 1B, 1C, and 1D are shown in proportion to sixty-eight percent (68%) of the allowable strain in those areas, the relatively large strains concentrated in the areas 26, 27, and 28 are within the allowable strain limits established for those areas. However, if the fabric skin 12 undergoes greater expansion, the relatively large strains concentrated around the conventional load patch 10 will be exacerbated, and will likely cause the fabric skin 12 to tear.

Therefore, while use of conventional load patches is suitable for pressurized airships configured for low altitude operation, such conventional load patches are unsuitable for high-altitude pressurized airships. Such high-altitude pressurized airships require their fabric skin to expand significantly. As discussed above, the conventional load patches would likely cause the fabric skin of high-altitude pressurized airships to tear because of the strain concentrations developed around the lamination area. Due to significant expansion of the fabric skin, high-altitude pressurized airships require use of load patches which limit development of strain concentrations along the fabric skin. Such load patches should limit contact with the fabric skin of the high-altitude pressurized airships, and be composed of materials which efficiently distribute the applied load to the fabric skin.

DISCLOSURE OF THE INVENTION

In light of the foregoing, it is a first aspect of the present invention to provide a load patch for airships.

It is another aspect of the present invention to provide a load patch comprising a load patch body having a first elastic sheet having a first and a second surface, a second elastic sheet having a first and a second surface, a plurality of filaments interposed between the first surface of the first and second elastic sheets, the plurality of filaments having a first end and a second end wherein the first end of the filaments are collected together to form an apex and the second end of the filaments radiate outwardly from the apex to a rear edge, and an attachment loop assembly attached to the plurality of filaments and a T-shaped attachment tape having a base and an arm section extending from the base wherein the rear edge of the plurality of filaments and the first and second elastic sheets are attached to the arm section of the T-shaped attachment tape.

Yet another aspect of the present invention is a load patch assembly adapted to secure load components to a fabric, the load patch assembly comprising at least one substantially elastic sheet having one end adapted to be secured to the fabric and an opposite end adapted to be secured to the load component, a plurality of substantially inelastic filaments secured to the sheet, the plurality of filaments emanating radially from the opposite end toward the one end, and an attachment tape secured to the one end and adapted to be secured to the fabric.

Still a further aspect of the present invention is a load patch used to interconnect a load component to a strained elastic surface, the load patch comprising at least one sheet having one end adapted to be secured to the strained elastic surface, the sheet having an opposite end adapted to be secured to the load component and a plurality of filaments secured in a direction generally between the ends, wherein the load patch is stiff in the direction of the load component applied to the load patch as compared to a direction of strain generated by the strained elastic surface.

BRIEF DESCRIPTION OF THE DRAWINGS

The filing of this patent contains at least one drawing executed in color. Copies of this patent or patent application publication with color drawing(s) will be provided by the Office upon request and payment of the necessary fee.

For a complete understanding of the objects, techniques and structure of the invention, reference should be made to the following detailed description and accompanying drawings, wherein:

FIG. 1B is a colored map depicting the relative amounts of axial strain which various localities on the fabric skin and conventional load patch of FIG. 1A are subjected to;

FIG. 1C is a colored map depicting the relative amounts of hoop strain which various localities on the fabric skin and conventional load patch of FIG. 1A are subjected to;

FIG. 1D is a colored map depicting the relative amounts of negative bias strain which various localities on the fabric skin and conventional load patch of FIG. 1A are subjected to;

FIG. 6B is a colored map depicting a cut-away of the load patch revealing the relative amounts of axial strain which various localities on the fabric skin and load patch of FIG. 6A are subjected to;

FIG. 6C is a colored map depicting a cut-away of the load patch revealing the relative amounts of hoop strain which various localities on the fabric skin and load patch of FIG. 6A are subjected to;

FIG. 6D is a colored map depicting a cut-away of the load patch revealing the relative amounts of negative bias strain which various localities on the fabric skin and load patch of FIG. 6A are subjected to.

DETAILED DESCRIPTION OF THE INVENTION

The load patch of the present invention is generally indicated by the numeral 30 as shown in the accompanying drawings. During its use, the load patch 30 is attached to the hull of a high-altitude pressurized airship (not shown) to secure various components such as moorings, handling lines, propulsion systems and the like thereto. Because the load patch 30 is configured for use with high-altitude pressurized airships, the load patch 30 is configured to efficiently distribute the applied load to the hull of such airships. Furthermore, the load patch 30 is attached to any portion of the hull in a manner that effectively limits contact therewith. The configuration of the load patch 30, and its manner of attachment to the hull limits development of strain concentrations along the hull of the high-altitude pressurized airship. As shown in the drawings, the load patch 30 comprises a patch body designated generally by the numeral 31 and a T-shaped attachment tape designated generally by the numeral 32. As will become apparent, the co-action of the body 31 and the tape 32 improve the overall integrity of the associated airship and enable the effective handling of components attached to a hull of the airship by the load patches. Although the load patch 30 is described in use with an airship, it will be appreciated that the load patch could be used in any application where a load is secured to a fabric, a laminate or other planar construction such as a sail, a tent, tarp, or especially any inflated flexible structure, such as an airship, hot-air balloon, or other pressurized body.

Figure 2A:
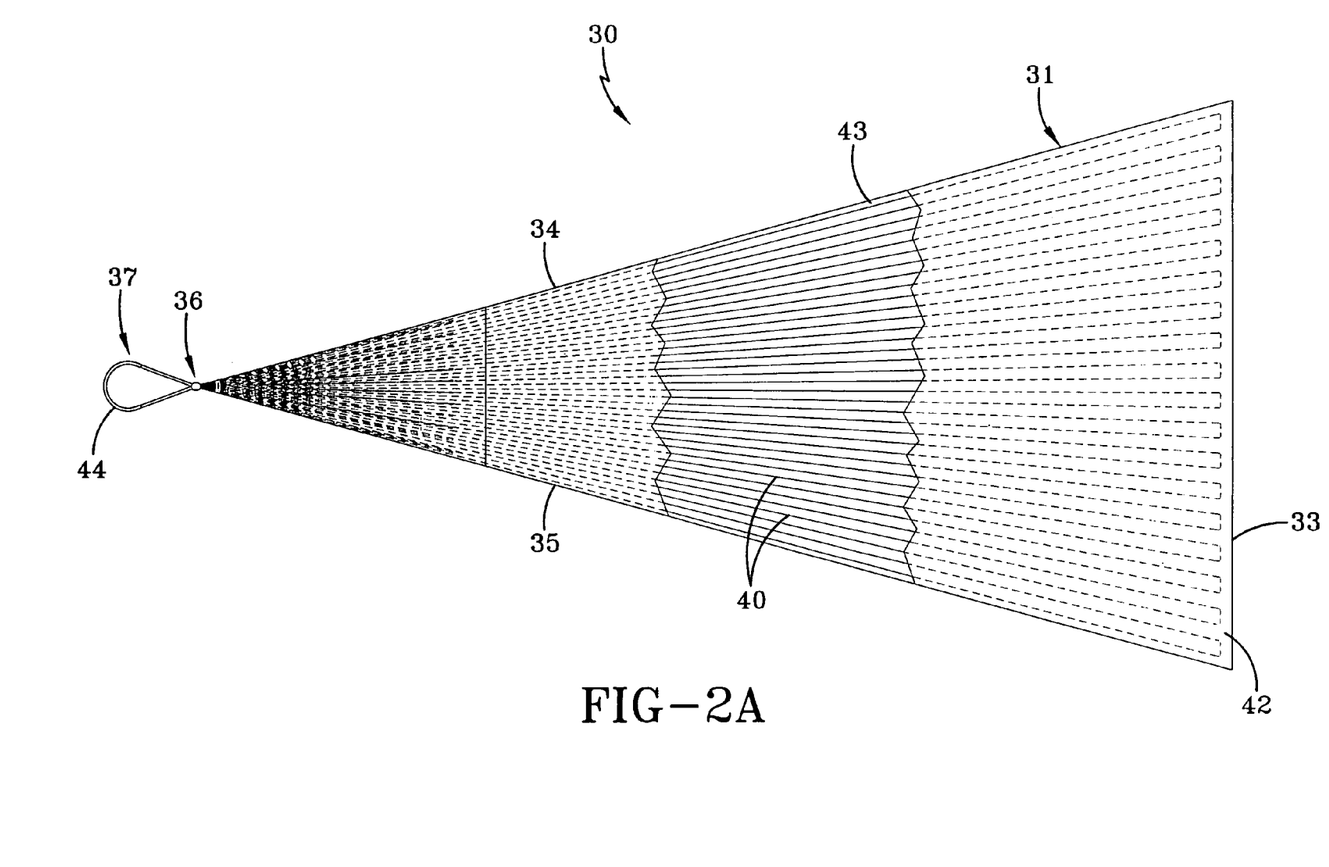
FIG. 2A is a fragmentary plan view of the load patch showing the filaments of the present invention.

As shown in FIG. 2A, the load patch body 31 is triangularly-shaped with a rear edge 33, a first angled edge 34 and second angled edge 35. The load patch body 31 is attached to the hull along its rear edge 33 using the T-shaped attachment tape 32 shown in FIG. 5, which will be more fully described later. Furthermore, the first angled edge 34 and second angled edge 35 intersect at an apex 36, and the various components are attached to the load patch 30 using a loop assembly 37 formed at and secured to the apex 36. As such, the applied load from the various components is transferred to the load patch 30 at the apex 36 using the loop assembly 37.

Figure 2B:
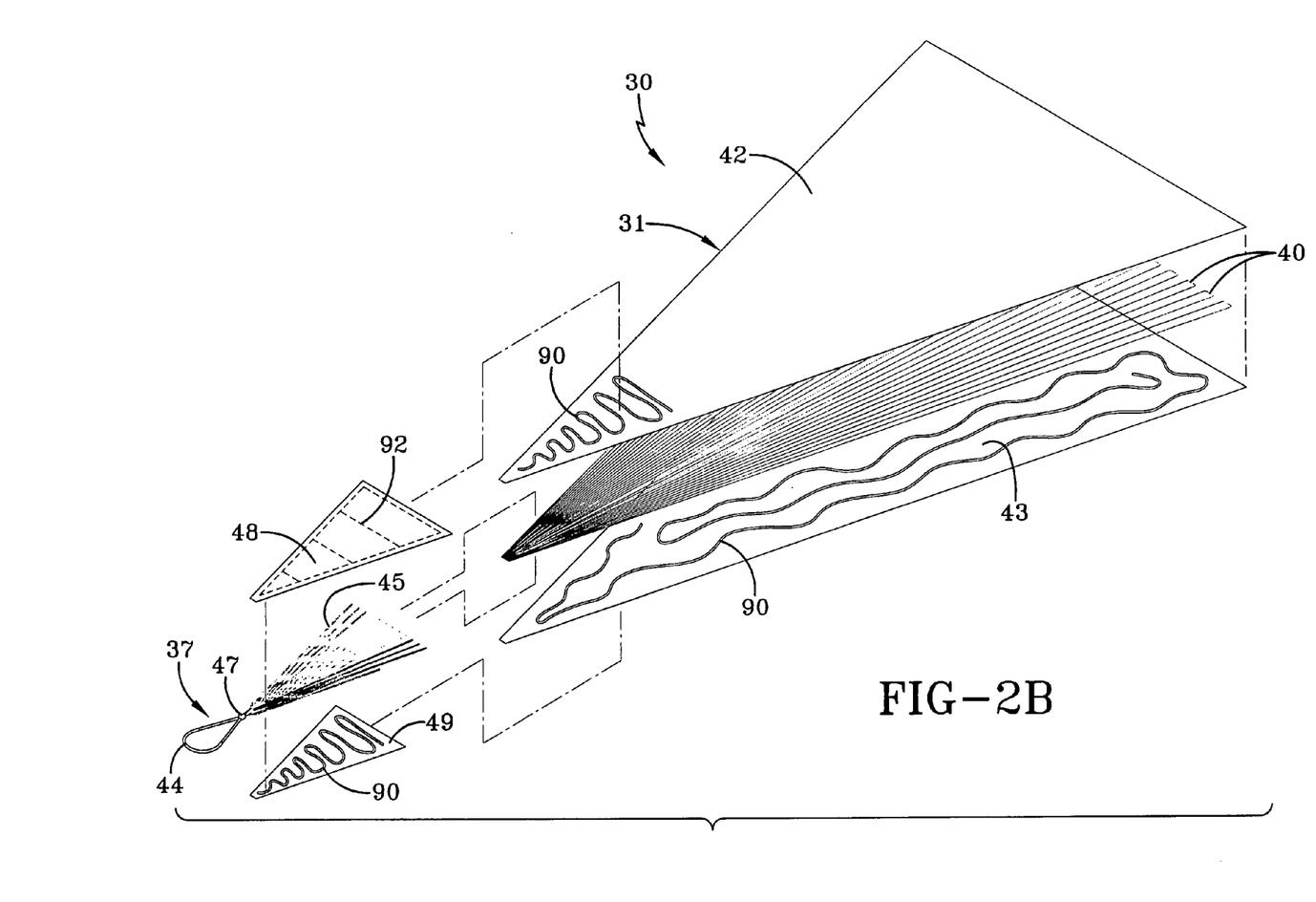
FIG. 2B is an exploded perspective view of the load patch of the present invention.

The load patch body 31 is configured to be compliant in the transverse direction, but non-compliant to strain applied in the lengthwise direction. As shown in FIG. 2B, the load patch body 31 is formed from various filaments 40 sandwiched between elastic first and second sheets 42 and 43. The sheets 42 and 43 may be constructed of a polyester film such as Mylar™ which has a thickness of about 0.75 mil. Of course, other polyester films with varying thicknesses exhibiting similar mechanical properties, such as elasticity, strength, weight, flexibility and so on, could be used for the sheets 42 and 43. Although the sheets 42 and 43 could be of any shape, it is believed that the triangular shape provides for the best distribution of applied forces. The various filaments 40 radiate from the apex 36 toward the rear edge 33, and the non-compliancy of the load patch 30 is provided thereby. The filaments 40 may be constructed of fibers exhibiting high strength and modulus, and high temperature resistance such as found in liquid crystal polymers such as Vectran™. Also sandwiched between the sheets 42 is the loop assembly 37 which includes an attachment loop 44 that serves as the connection interface with the mooring lines or other components secured to the hull. The loop assembly 37 includes a plurality of loop strands 45 which are typically constructed of a material like the filaments 40 or a material substantially equivalent thereto. The strands 45 may be separated into two groups, wherein one group is splayed or disposed over the filaments 40 and the other group is splayed or disposed underneath. And one of the groups may be longer than the other, or strands within the groups may be of different lengths to prevent stress concentration. In any event, an attachment tie 47, which is located at the apex 36, groups the loop strands 45 together and forms them into the attachment loop 44. The loop strands 45 are layered upon or otherwise intermeshed with the filaments 40, all of which are sandwiched or received between the sheets 42 and 43.

A reinforcement tab 48 and a reinforcement tab 49 are positioned over respective sheets 42 and 43 and encapsulate the materials assembled therebetween. The tabs 48 and 49 are triangle-shaped to match the ends of the sheets, and they may be sized the same or differently as shown. The tabs may be constructed of a polyester fiber material such as Dacron or the equivalent. The stacked or assembled layers—tab 48, sheet 42, strands 45/filaments 40, sheet 43, and tab 49—may be secured to each other with a compatible adhesive 90, which may further be reinforced with stitching 92 that interlocks the various strands and filaments to one another.

Because the various filaments 40 are somewhat inelastic, they serve to prevent the load patch body 31 from stretching in the lengthwise direction. As such, when the applied load from the various components is applied, the load patch 30 can be pulled taut to transfer the applied load therethrough. Furthermore, the arrangement of the various filaments 40 serve to disperse the applied load radially outward from the loop assembly 37 into the hull of the high-altitude pressurized airship.

The compliancy of the load patch body 31 in the transverse direction is provided by the arrangement of various filaments 40 and strands 45 between elastic first and second fabric sheets 42 and 43. The separation of the various filaments 40 and strands 45 from one another, and the elasticity of the elastic first and second fabric sheets 42 and 43 allow the load patch body 31 to stretch transversely, and, therefore, provides its compliancy in the transverse direction, along the point of attachment to a hull of a pressurized airship. The compliancy of the load patch body 31 in the transverse direction is provided to limit resistance to expansion during the expansion of the hull. As such, the load patch 30 is capable of accommodating expansion of the hull or attached planar material, thus limiting the strain concentrations developed therein.

Thus, when the load patch 30 is attached to the high-altitude pressurized airship, the applied load is efficiently distributed therethrough to the hull. Additionally, because the various filaments 40 are inelastic, the force generated by the applied load is efficiently transferred therethrough. Furthermore, the separation of the various filaments 40 and strands 45 disperses the applied load radially outward from the attachment loop assembly 37 into the hull. Simultaneously, the compliancy of the load patch 30 in the transverse direction limits development of strain concentrations along the hull.

The load patch body 31 is attached to the hull of the high-altitude pressurized airship using the T-shaped attachment tape 32. The T-shaped attachment tape 32 effectively limits the contact of the load patch 30 with a fabric skin 50. As discussed below, the lamination area formed by the T-shaped attachment tape 32 and the material of the hull is significantly smaller than the lamination area formed using a conventional load patch. As such, the attachment of the load patch body 31 to the hull material using the T-shaped attachment tape 32 serves to limit the development of strain concentrations along the hull of the high-altitude pressurized airship.

Figure 3:
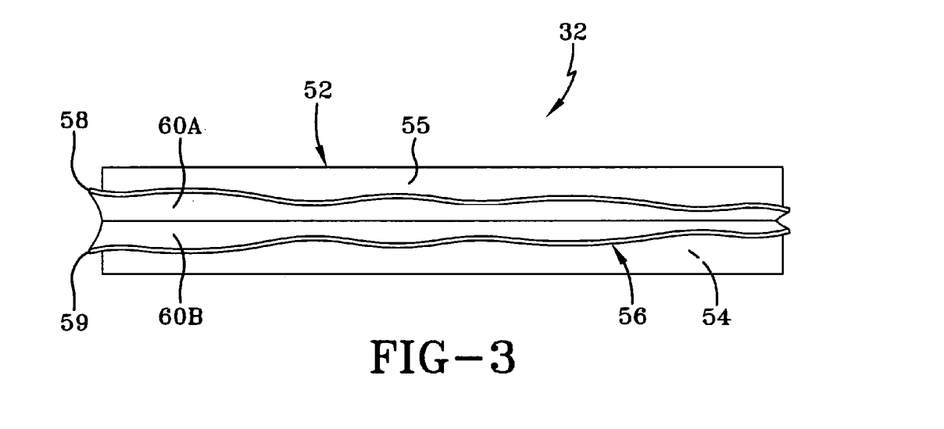
FIG. 3 is a plan view of the T-shaped attachment tape of the present invention.
Figure 4:
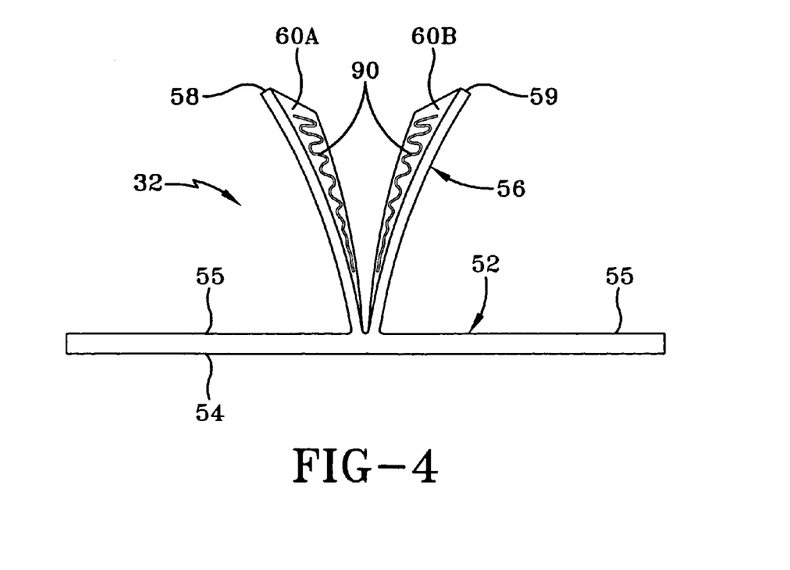
FIG. 4 is a side elevational view of the T-shaped attachment tape according to the present invention.
Figure 5:
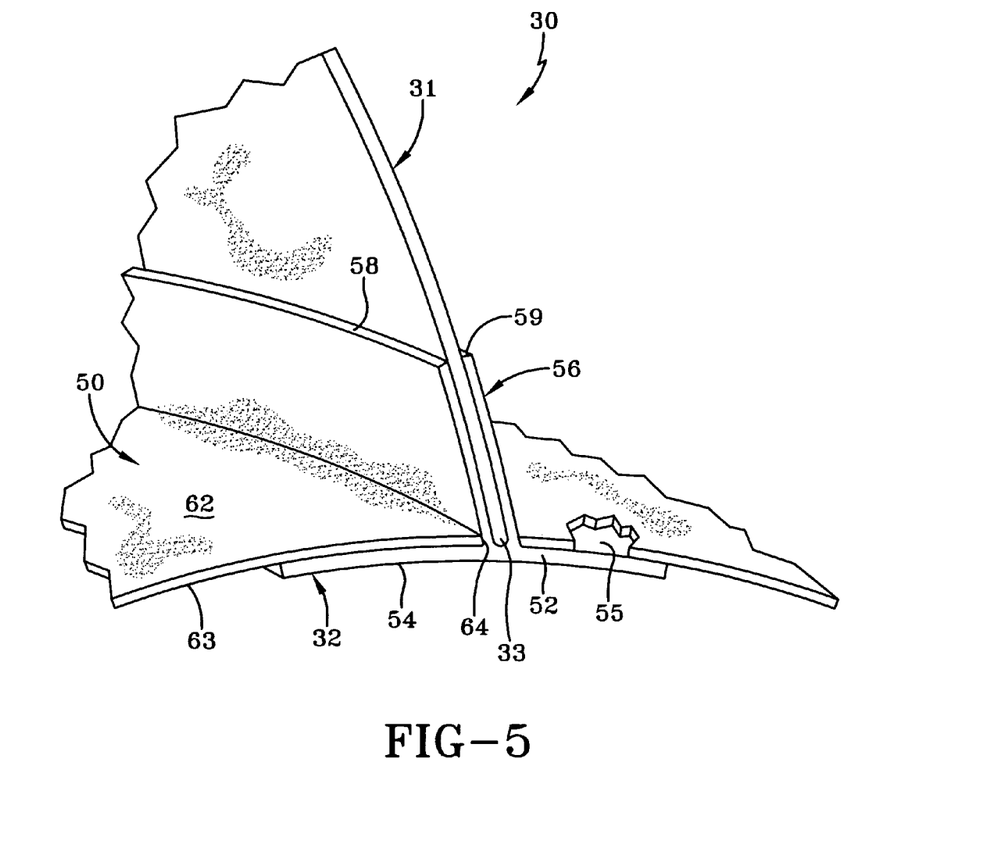
FIG. 5 is a partial perspective view, partially cut-away, of the T-shaped attachment tape of the present invention that is attached to the fabric skin, the load patch being secured between a first arm segment and a second arm segment thereof.

As seen in FIGS. 3-5, the T-shaped attachment tape 32 includes a base portion 52 having an interior surface 54 and a hull surface 55 bisected by an arm section 56. The arm section 56 extends outwardly from the hull surface 55 and includes a first arm segment 58 and a second arm segment 59 having inner surfaces 60A and 60B, respectively. The area of the load patch body 31 proximal the rear edge 33 is sandwiched between the arm segments 58 and 59. That is, the area of the load patch body 31 directly adjacent the rear edge 33 (sheets 42 and 43) is secured to the inner surfaces 60A and 60B such that the body 31 is trapped between the arm segments 58 and 59. An adhesive, such as a liquid adhesive, having suitable bonding strength can be used to secure the body 31 to the inner surfaces 60A and 60B of the first arm segment 58 and second arm segment 59, respectively. Of course, stitching may be used to secure the patch body 31 to the tape 32.

Thereafter, the T-shaped attachment tape 32 is secured to the fabric skin 50 which forms the hull of the airship. One exemplary fabric is disclosed in U.S. patent application Ser. No. 10/388,772, published as U.S. Published Application No. 2004/0180161-A1, which is incorporated herein by reference. Of course, other airships or other materials which need load patches could be used. As seen in FIG. 5, the fabric skin 50 has an outer surface 62 and an inner surface 63, and includes a slit 64 therein adapted to receive the arm section 56. To attach the T-shaped attachment tape 32 to the fabric skin 50, the base portion 52 is inserted through the slit 64, and both sections of the hull surface 55 are attached to the inner surface 63 of the fabric skin 50. The attachment of the T-shaped attachment tape 32 to the fabric skin 50 may be achieved using any suitable adhesive, or the like. Of course, the attachment of the tape 32 to the fabric skin 50 must provide a gas tight connection.

When the base portion 52 is attached to the fabric skin 50, a lamination area 66 is formed. The lamination area 66 (FIG. 6A) is effectively defined by the dimensions of the hull surface 55. Additionally, the length and stiffness of the lamination area 66 formed by use of the T-shaped attachment tape 32 to attach the load patch 30 to the fabric skin 50 determines the amount of strain concentrations along the hull of the high-altitude pressurized airship.

Figure 6A:
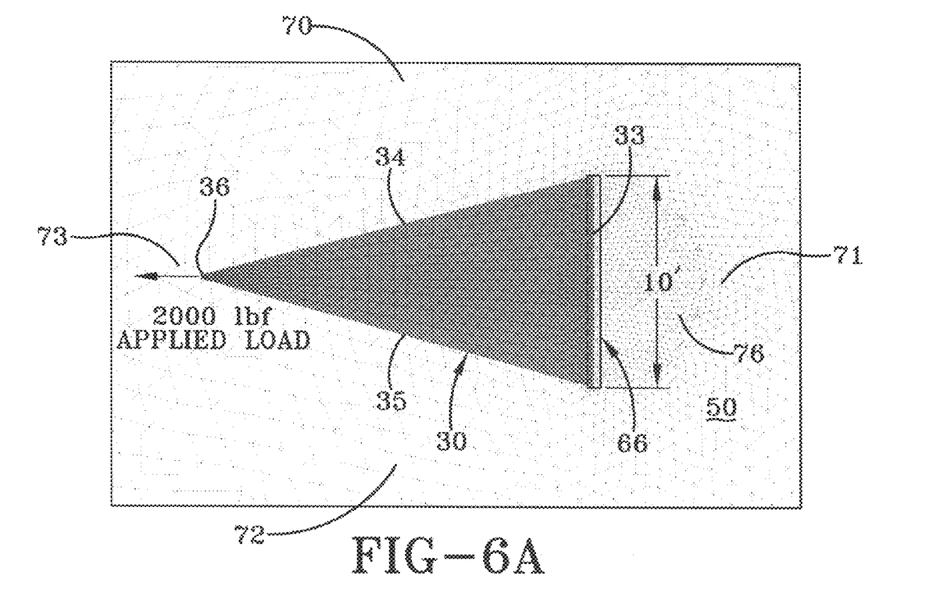
FIG. 6A is a representational view of a load patch according to the present invention attached to the fabric skin of a high-altitude pressurized airship.

To illustrate the relative amounts of strain developed along the hull of the high-altitude pressurized airship, FIGS. 6A, 6B, 6C, and 6D are provided. FIG. 6A depicts the load patch 30 attached to the fabric skin 50, and the lamination area 66 formed by the attachment of the load patch body 31 using the T-shaped attachment tape 32. The fabric skin 50 is configured to expand significantly during inflation of the high-altitude pressurized airship, and during changes in atmospheric pressure. Furthermore, an exemplary load of 2000 lbf. is applied at the apex 36 to simulate the loads applied by the moorings, handling lines, and propulsion systems to the fabric skin 50 through the load patch 30.

Figure 6B:
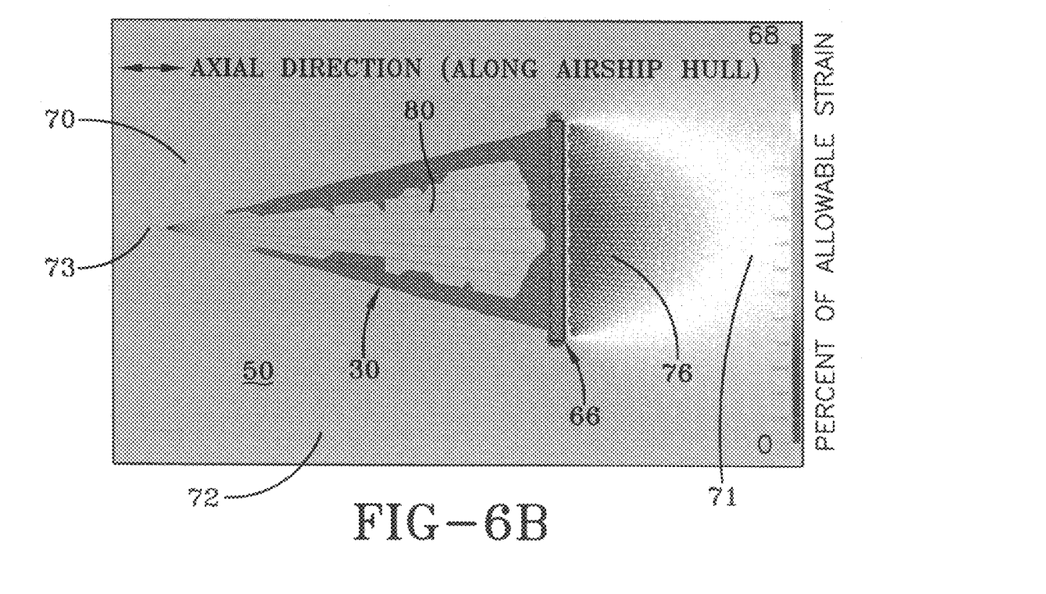
Figure 6C:
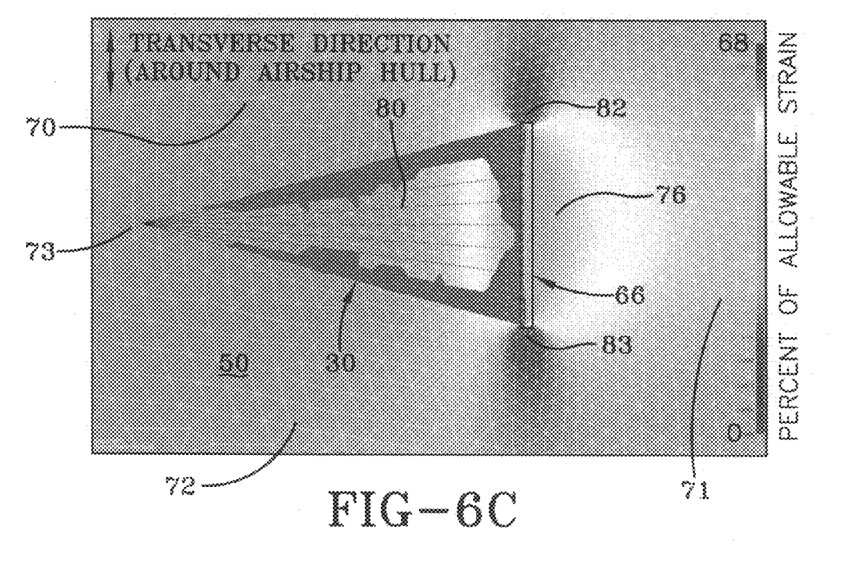
Figure 6D:
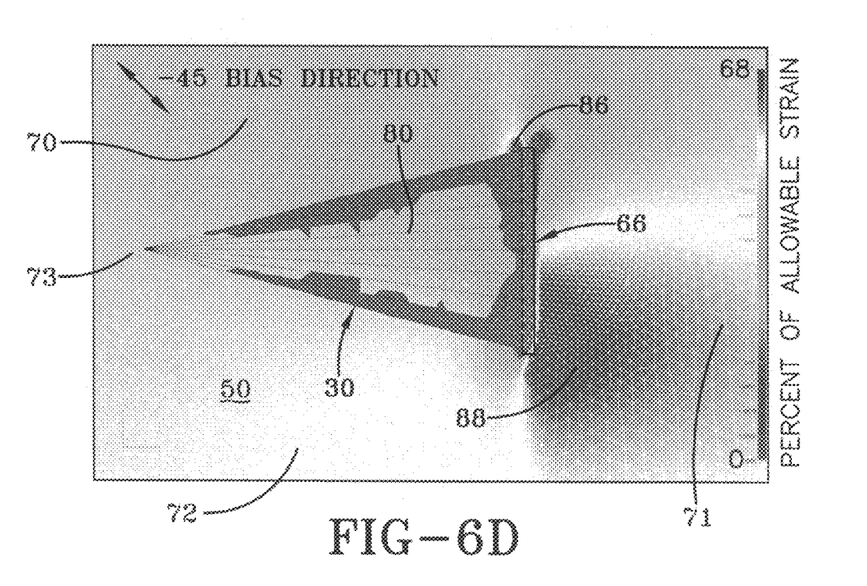

Using various colors to represent relative amounts of strain as previously discussed with respect to the conventional load patch 10, FIG. 6A and the background of FIGS. 6B, 6C, and 6D demonstrate the deformation of the fabric skin 50 during expansion of the fabric skin 50 and during application of the applied load.

In contrast to the conventional load patch 10, discussed with respect to FIGS. 1A-D, the present load patch 30 limits the extent to which relatively large strains are concentrated in the fabric skin 50 in response to pressurization at the lamination area 66. For example, as seen in FIG. 6B, the strain developed in the axial direction is concentrated in area 76 as a somewhat semi-circular shape projecting outwardly from the rear edge 33, but unlike with use of the conventional load patch 10, the strains are not concentrated adjacent the apex 36. In fact, in the area 80 underneath the load patch, and areas 70, 71, 72, and 73, relatively small amounts of strain develop. Furthermore, as seen in FIG. 6C, the strain developed in the transverse direction are concentrated in relatively large areas 82 and 83 adjacent the distal ends of the lamination area 66. Moreover, as seen in FIG. 6D, the strain developed in the negative bias direction are concentrated in a small area 86 adjacent one distal end of the lamination area 66, and in a large area 88 adjacent the other distal end of the lamination area 66. Overall, the strain developed in the load patch 30 is significantly lower than the strain developed in corresponding areas of the conventional load patch 10. In addition, the size and number of the areas experiencing strain of the load patch 30 are significantly reduced over that of the conventional load patch 10.

Figure 7:
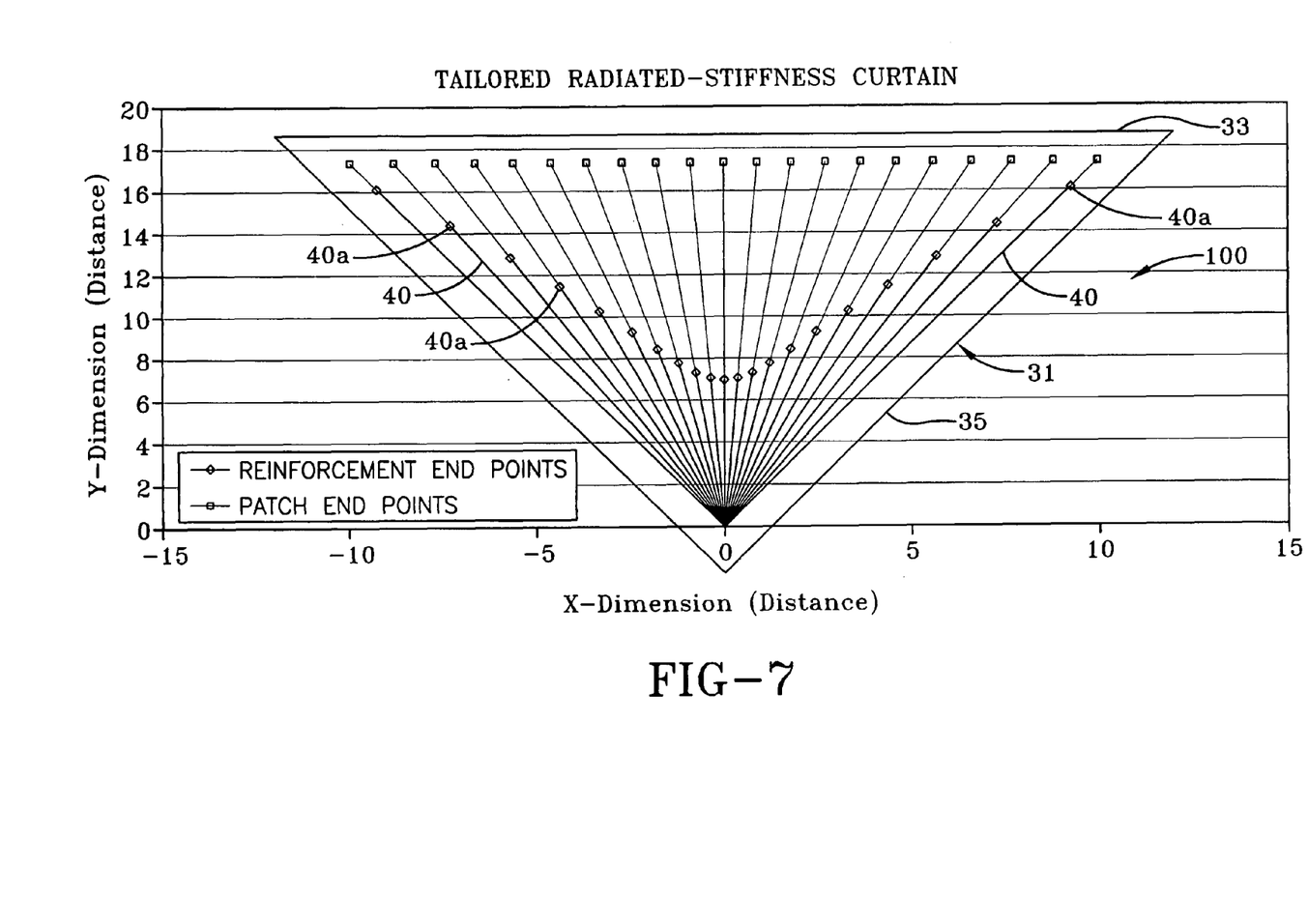
FIG. 7 is a schematic representation of tailored filaments used to selectively distribute load patch hull stresses.

Referring now to FIG. 7, a load patch with a tailored radiated stiffness configuration is designated generally by the numeral 100. In this configuration, the filaments 40 have ends 40a that are selectively positioned on the load patch body 31. For example, the ends 40a proximal the edges 34 and 35 may be longer than those ends more medially disposed. Accordingly, the stiffness of the patch may be varied continuously through the patch angle by bonding the ends 40a to the facing surfaces of at least one of the sheets 42 and 43. Thus, it will be appreciated that any hull stress distribution may be attained by selectively positioning and distributing the ends 40a on either of the sheets 42 and 43.

In conclusion, the load patch 30 is configured to efficiently distribute the applied load to the hull, and is attached to the hull in a manner which effectively limits contact therewith. The configuration of the load patch 30, and its manner of attachment to the hull fabric limit development of strain concentrations along the hull of the high-altitude pressurized airship.

It will, therefore, be appreciated that one advantage of one or more embodiments of the present invention is that the load patch is non-compliant in its lengthwise direction, allowing the load patch to radially disperse forces, generated by an attached load, into the hull of the high-altitude pressurized airship. Still another advantage of the present invention is that the load patch is transversely compliant, and as such, is able to stretch as the hull increases in size as the internal pressure of the high-altitude pressurized airship increases. Yet another advantage of the present invention is that the lamination area defined by the T-shaped attachment tape used to affix the load patch body to the hull of the high-altitude pressurized airship is reduced. The transverse compliance of the load patch body, along with the reduced lamination area of the T-shaped attachment tape, contributes to the reduction in strain concentrations that develop in the high-altitude pressurized airship as the hull expands. And the hull stress distribution associated with the load patch can be tailored or varied to specific types of load application.

Thus, it should be evident that the load patch body and the T-shaped attachment tape used in attaching the load patch disclosed herein carries out one or more of the objects of the present invention set forth above and otherwise constitutes an advantageous contribution to the art. As will be apparent to persons skilled in the art, modifications can be made to the preferred embodiment disclosed herein without departing from the spirit of the invention, the scope of the invention herein being limited solely by the scope of the attached claims.

What is claimed is:

1. A load patch used to interconnect a load component to an elastic surface of a pressurized airship, the load patch and the pressurized airship comprising:
   a fabric skin of a pressurized airship, said fabric skin comprising an elastic surface; and
   a load patch comprising:
      a first elastic sheet having a first and a second surface, and
      a second elastic sheet having a first and a second surface, wherein said first and second elastic sheets are secured to said elastic surface, and wherein said elastic sheets expand and contract in substantially the same manner as said elastic surface, said elastic sheets having a rear edge and angled edges, wherein said angled edges intersect at an apex which is adapted to be secured to the load component; and a plurality of substantially inelastic filaments disposed substantially transversely on said elastic sheets and interposed between said first surface of said first and second elastic sheets, said plurality of filaments having a first end and a second end, wherein said first end of said filaments are collected together at said apex, and said second end of said filaments radiate outwardly from said apex to said rear edge of said elastic sheets;

said plurality of substantially inelastic filaments extending from said apex toward said rear edge wherein only said rear edge is attached to said fabric skin such that said plurality of substantially inelastic filaments are disposed substantially transversely to the expansion and contraction forces exerted on said elastic surface when the pressurized airship expands and contracts and wherein said substantially inelastic filaments are aligned on said elastic sheet to transfer any load applied to the load component;

an attachment assembly attached to said plurality of said filaments; and an attachment tape having:
a base, and
an arm section extending from said base and away from said fabric skin,
wherein only said rear edge of said first and second elastic sheets are attached to said arm section of said attachment tape, wherein said elastic sheets and said attachment tape expand and contract in substantially the same manner, and wherein said plurality of filaments are disposed substantially transversely to the expansion and contraction forces exerted along said attachment tape.

2. The load patch according to claim 1, wherein said attachment assembly is connected to said apex, said attachment assembly having a plurality of loop strands meshed and aligned with said plurality of filaments.

3. The load patch according to claim 1, wherein said elastic sheets are compliant in a direction substantially transverse to the direction of the applied load.

4. The load patch according to claim 1, wherein said attachment assembly further comprises:
a plurality of loop strands;
an attachment tie securing one end of said plurality of loop strands; and
an attachment loop extending from said attachment tie.

5. The load patch assembly according to claim 4, wherein an opposite end of said loop strands are positioned to emanate radially from said attachment tie and intermesh with said plurality of filaments.

6. The load patch assembly according to claim 5, further comprising:
an adhesive material, which secures said plurality of loop strands, said plurality of filaments and said first surfaces of said first and second elastic sheets to one another.

7. The load patch according to claim 6, further comprising:
at least one reinforcement tab secured to at least one of said second surfaces of said first and second elastic sheets proximal said apex.

8. The load patch according to claim 7, wherein said at least one reinforcement tab is stitched to said first and second elastic sheets.

9. The load patch according to claim 1, wherein said arm section of said attachment tape comprises:
arm segments which have facing inner surfaces, wherein said rear edge is secured to said facing inner surfaces.

10. The load patch according to claim 9, further comprising:
an adhesive material, which secures said second surfaces of said elastic sheets to said facing inner surfaces.

11. The load patch according to claim 1, wherein said attachment assembly is adapted to be secured to a load component, said assembly having a plurality of substantially inelastic loop strands secured to said first and second elastic sheets.

12. The load patch according to claim 11, wherein said loop strands are intermeshed with said plurality of filaments.

13. The load patch according to claim 12, wherein said assembly includes an attachment tie which collects one end of said plurality of loop strands, and an attachment loop which extends from said attachment tie.

14. The load patch according to claim 13, further comprising:
at least one reinforcement tab secured to one of said first and second elastic sheets, said plurality of filaments and said loop strands.

15. The load patch according to claim 11, wherein each said first and second elastic sheet is a polyester film, and said plurality of filaments and said plurality of loop strands are liquid crystal polymers.

16. The load patch according to claim 11, wherein said first and second elastic sheets each have a substantially triangular shape with said apex at one end opposite said rear edge, said loop strands received between said sheets and radiating from said apex toward said edge; and
a pair of substantially elastic reinforcement tabs receiving said sheets, said plurality of filaments and said plurality of strands therebetween and secured thereto.

17. The load patch assembly according to claim 16, wherein said arm section has facing inner surfaces which are secured to said edge.

18. The load patch according to claim 1, wherein each of said plurality of filaments has an end, and wherein an end of said filaments proximal said angled edges are longer than ends of said filaments that are medially disposed and secured to said elastic sheets so as to generate a desired strain distribution of the load component.

19. The load patch according to claim 18, wherein said elastic sheets are substantially triangle-shaped with said apex of said triangle shape proximal the load component and wherein said filament ends are longer along said angled edges of said triangle shape than in an area between said angled edges, and wherein the filament ends in the area between said angled edges do not extend to said rear edge.

* * * * *